US012319326B2

(12) United States Patent
Maggiora et al.

(10) Patent No.: US 12,319,326 B2
(45) Date of Patent: Jun. 3, 2025

(54) SYSTEM, A VEHICLE AND A METHOD FOR THE DETECTION OF POSITION AND GEOMETRY OF LINE INFRASTRUCTURES, PARTICULARLY FOR A RAILWAY LINE

(71) Applicant: DMA S.r.l., Turin (IT)

(72) Inventors: Riccardo Maggiora, Turin (IT); Sara Salvador, Turin (IT)

(73) Assignee: DMA S.r.l., Turin (IT)

( * ) Notice: Subject to any disclaimer, the term of this patent is extended or adjusted under 35 U.S.C. 154(b) by 338 days.

(21) Appl. No.: 17/621,342

(22) PCT Filed: May 26, 2020

(86) PCT No.: PCT/IB2020/054967
§ 371 (c)(1),
(2) Date: Dec. 21, 2021

(87) PCT Pub. No.: WO2020/260978
PCT Pub. Date: Dec. 30, 2020

(65) Prior Publication Data
US 2022/0388553 A1 Dec. 8, 2022

(30) Foreign Application Priority Data
Jun. 26, 2019 (IT) .................. 102019000010209

(51) Int. Cl.
*B61L 23/04* (2006.01)
*G01S 13/88* (2006.01)

(52) U.S. Cl.
CPC ............. *B61L 23/04* (2013.01); *B61L 23/047* (2013.01); *B61L 23/048* (2013.01); *G01S 13/88* (2013.01)

(58) Field of Classification Search
None
See application file for complete search history.

(56) References Cited

U.S. PATENT DOCUMENTS 6,163,755 A * 12/2000 Peer ...................... B61L 23/044
701/19
2013/0194126 A1* 8/2013 Paoletti .................. G01S 13/87
342/55

(Continued)

FOREIGN PATENT DOCUMENTS

| CN | 107678036 A | 2/2018 |
| WO | 9731810 A1 | 9/1997 |

OTHER PUBLICATIONS

International Search Report and Written Opinion dated Sep. 11, 2020. 11 pages.

*Primary Examiner* — Whitney Moore
(74) *Attorney, Agent, or Firm* — RMCK Law Group PLC (57) ABSTRACT

A detection system and method for line infrastructures of a railway line includes: at least one electromagnetic-wave detection device having at least one transceiver antenna, the electromagnetic-wave detection device being configured for emitting electromagnetic waves towards a line infrastructure by means said at least one transceiver antenna and for receiving electromagnetic waves reflected by said line infrastructure; and a control unit configured for processing the electromagnetic waves reflected by said line infrastructure and determining a position of said line infrastructure with respect to a pre-set reference system. The at least one electromagnetic-wave detection device is configured for installation on board a railway vehicle.

10 Claims, 7 Drawing Sheets

(56) References Cited

U.S. PATENT DOCUMENTS

2018/0329052 A1\* 11/2018 Gallagher ................ G01V 3/36
2021/0046959 A1\* 2/2021 Ueda .................... B61L 23/041

\* cited by examiner

SYSTEM, A VEHICLE AND A METHOD FOR THE DETECTION OF POSITION AND GEOMETRY OF LINE INFRASTRUCTURES, PARTICULARLY FOR A RAILWAY LINE

CROSS-REFERENCE TO RELATED APPLICATIONS

This application is a 371 National Stage of International Application No. PCT/IB2020/054967, filed May 26, 2020, which claims priority to Italian Patent Application No. 102019000010209 filed Jun. 26, 2019. The disclosure of each of the above applications is incorporated herein by reference in its entirety.

FIELD OF THE INVENTION

The present invention relates to diagnostic systems for railway infrastructures, in particular to systems for detecting and monitoring line infrastructures, such as catenaries and catenary-support poles and profile of the ballast.

PRIOR ART

Figure 1:
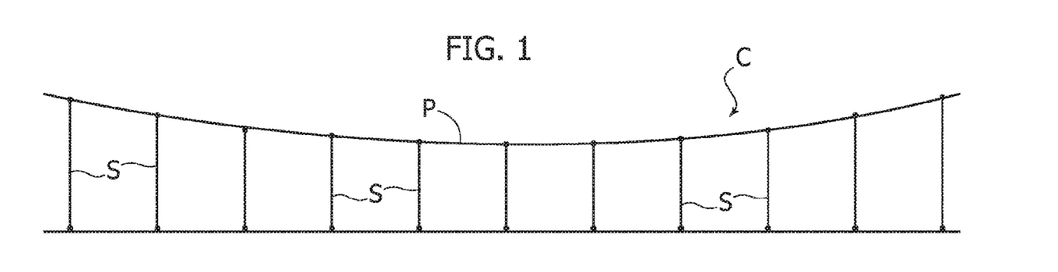
FIGS. 1 to 3, which have already been described, illustrate an overhead power line and two characteristic cross sections thereof, respectively.
Figure 2:
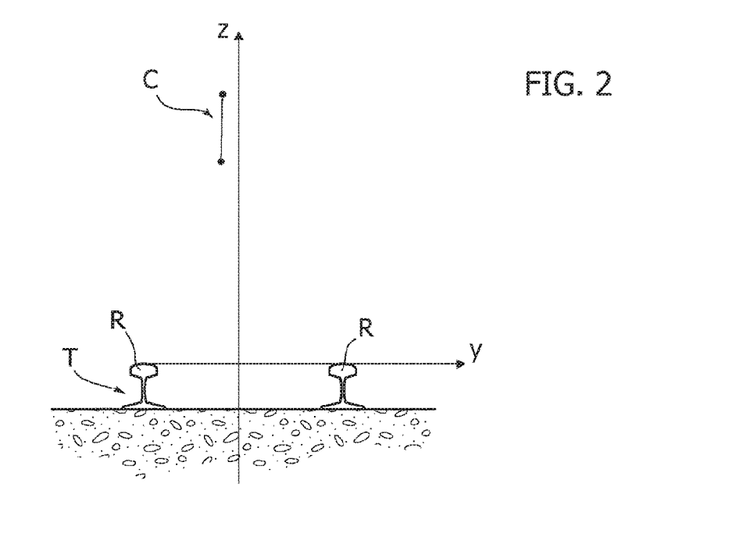
Figure 3:
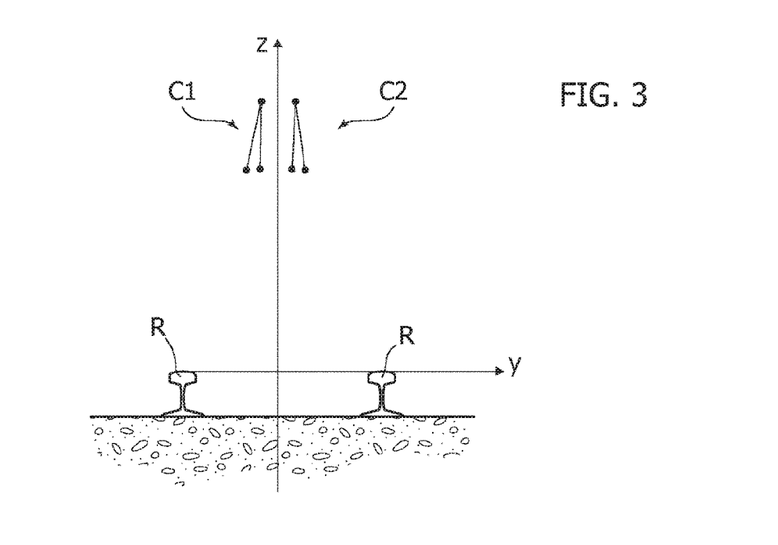
Figure 4:
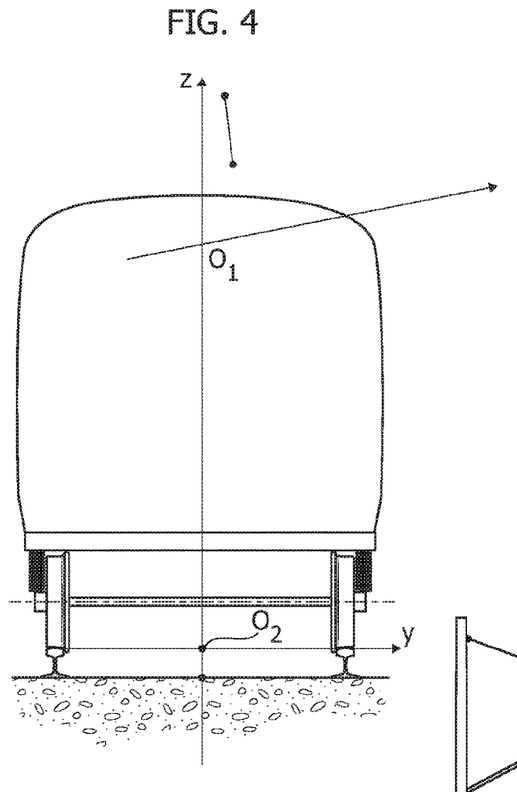
FIGS. 4 and 5 illustrate conditions provided by way of example of displacement of line infrastructures with respect to the middle of the plane of the rails.
Figure 5:
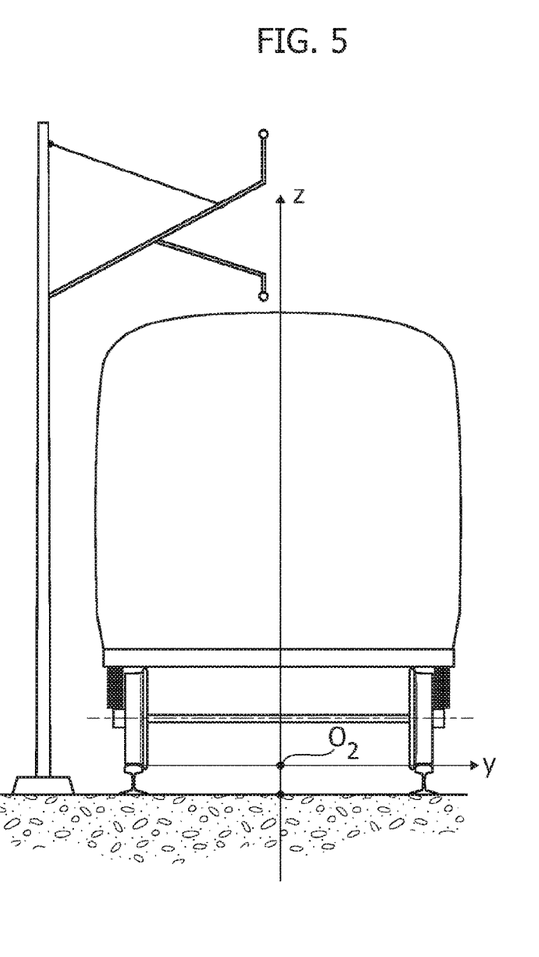

In railway infrastructures, determination of the position of the contact wire and of the weight-carrying cable of the overhead power line with respect to the track is important for the purpose of ensuring that they are located in the right position with respect to contact with the contact shoe of the pantograph of railway vehicles. An erroneous contact geometry may, in fact, cause the pantograph to be accidentally caught up in the wires, with most likely destruction of both. With reference to FIG. 1, an overhead power line C includes a weight-carrying cable or catenary P, from which a contact wire L is suspended by means of a plurality of droppers S. The contact wire L may be single, as is for example the case of the cross-sectional view of FIG. 2, or else double, as in the case of the cross-sectional view of FIG. 3. Moreover, if Z denotes the vertical axis centred in the middle of the grade of the track, the overhead line C may be located in a position more or less staggered with respect to the axis Z, meaning thereby either the fact that it may be set at a distance from the middle line on just one side of the middle line itself or the fact that it passes from one side to the other of the middle line.

Currently, there exist instruments for measuring the position of the contact wire L and of the weight-carrying cable P with respect to the track, which are based upon a contact system. These are contact sensors normally added to the pantograph of a diagnostic vehicle for measuring the height of the contact wire L and in certain cases the lateral position thereof with respect to the middle of the track, which may vary according to the development of the overhead line in the plane of the rails (axis Y), or else according to the presence of switches or intersections, or simply as a result of compensation of thermal expansion by means of tensioning weights or for any other reason.

In addition, a further drawback, albeit partial, lies in the fact that this instrument is able to measure the position of the overhead line only in working conditions when the wire L is shifted with respect to the resting position on account of interaction with the pantograph.

Of course, measurement of the position in working conditions is of some interest for the purposes of diagnostics, but it is the resting position that is more interesting in so far as it is the latter that enables a prognostic activity in regard to possible drawbacks when the railway vehicle is travelling.

There moreover exist numerous contactless measuring instruments designed to measure the position of one or more wires L according to their type. When these instruments are installed in the proximity of a pantograph, they can measure both the position under the pressure of the pantograph (i.e., with the pantograph raised) and the static or resting position (i.e., with the pantograph lowered). These instruments are prevalently of an optical type and are based upon rotary scanners (LIDARs) or optical triangulation of various types.

Albeit sufficiently accurate and potentially capable of monitoring overhead lines not strictly in working conditions, the main drawback from which these instruments suffer is soiling. Since they are optical devices, they need transparent or in any case refractive windows, through which the measurement proper is made. Since these windows are located in any case in portions exposed to severe weather conditions on the railway vehicle, they are affected by an extremely fast degradation of performance due to soiling by atmospheric agents and/or to soiling resulting from accumulation of material that detaches from the moving railway vehicle, such as grease, dirt, and liquids.

Also detection of a transverse profile of the ballast on the grade is an important aspect, albeit relatively independent of what has been set forth above. The ballast is the layer of crushed stone that keeps the sleepers, and hence the track, fixed to the ground. The height of the ballast with respect to the sleepers is quite a critical parameter: it must be sufficient to hold the track to the ground, but not excessive, both so as not to waste material and so as to prevent the stones raised by the displacement of air due to the passage of the train from damaging the train or the infrastructure.

Also for determining the profile of the ballast, optical instruments are currently used, which suffer from the same problems referred to above.

OBJECT OF THE INVENTION

The object of the present invention is to solve the technical problems mentioned previously. In particular, the object of the present invention is to provide a system for detecting the position of line infrastructures, such as overhead lines, support poles, and profile of the ballast, that will enable operation in a way substantially insensitive to soiling by atmospheric agents or contamination due to the movement of the vehicle itself.

SUMMARY OF THE INVENTION

The object of the present invention is achieved by a system, a railway vehicle, and a method having the features forming the subject of the ensuing claims, which form an integral part of the technical disclosure provided herein in relation to the invention.

BRIEF DESCRIPTION OF THE FIGURES

The invention will now be described with reference to the attached figures, which are provided purely by way of non-limiting example and in which.

DETAILED DESCRIPTION

Figure 6:
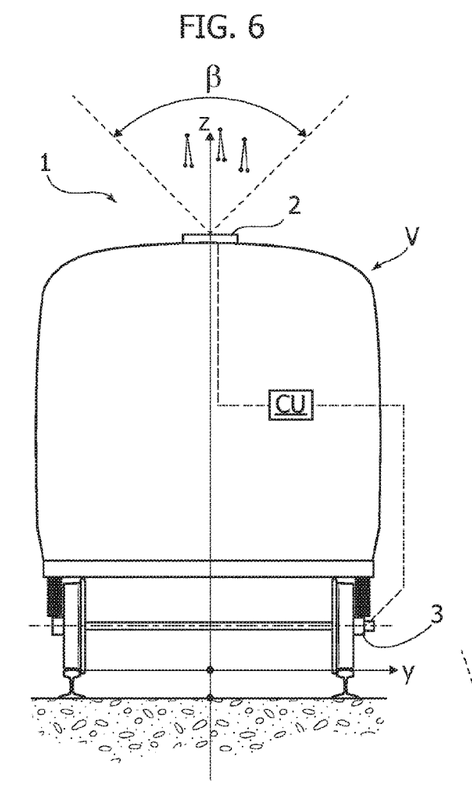
FIGS. 6 and 7 illustrate two embodiments of the measurement system according to the invention.
Figure 7:
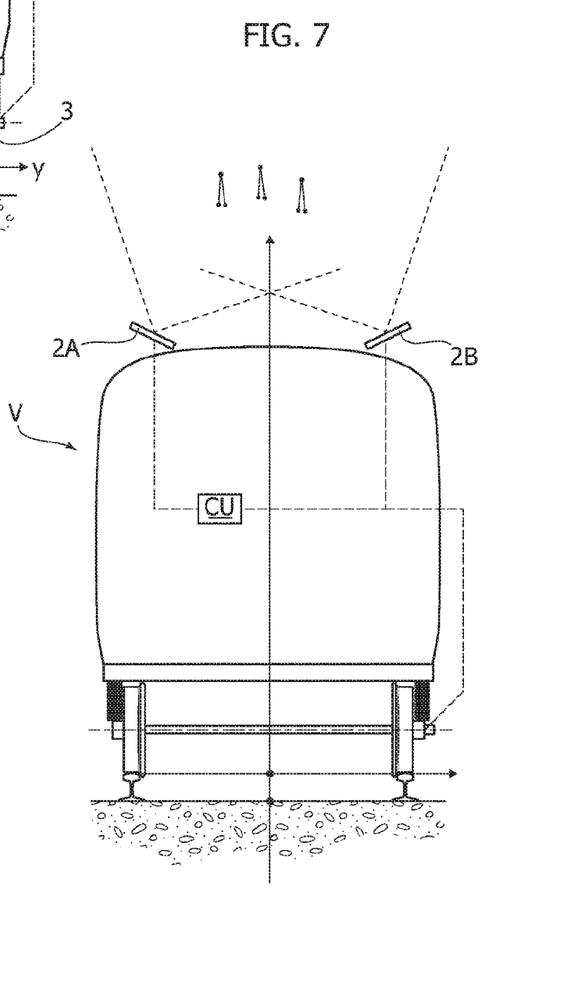

In FIGS. 6 and 7, the reference number 1 designates a detection system for railway infrastructures according to various embodiments of the invention. The detection system 1 comprises at least one electromagnetic-wave detection device 2, which in turn comprises at least one transceiver antenna.

In some embodiments, such as the one illustrated in FIG. 7, the detection system may comprise two electromagnetic-wave detection devices designated by the reference numbers 2A, 2B. The at least one transceiver antenna of each device 2, 2A, 2B is configured for emitting electromagnetic waves towards a line infrastructure and for receiving electromagnetic waves reflected by the line infrastructure.

The system 1 is conveniently mounted on the roof of a railway vehicle, but—according to the line infrastructure to undergo detection—other locations are possible.

In a preferred embodiment, the detection device 2 comprises a radar of the so-called phased-array type, including a plurality of transceiver antennas supplied in a sequential way, with a pre-set phase delay so that the overall wave front will be able to sweep an angle β of amplitude sufficient to cover the range of variability of positions of the overhead line C of interest for the particular type of application.

In a phased-array radar, supply of the array of transceiver antennas with signals having a pre-set phase difference generates a wave front with a known angular phase offset with respect to the axis of the radar itself. This means that, by varying the phase offset in time, it is possible to sweep the angle β, in effect defining the operating range of the device 2.

The system 1 further comprises an electronic control unit CU, which is configured for receiving a signal representing the electromagnetic wave reflected and intercepted by the transceiver antennas of the device 2 and for determining a position of the line infrastructure with respect to a pre-set reference system. In general, the electronic control unit CU receives an ensemble of signals that comprise information regarding the electromagnetic waves emitted and the electromagnetic waves reflected. Given that processing of the signal data regarding the electromagnetic waves reflected is particularly complex, processing is carried out by means of dedicated computing units (such as DSPs+RISC CPUs, and possibly FPGAs).

Figure 8:
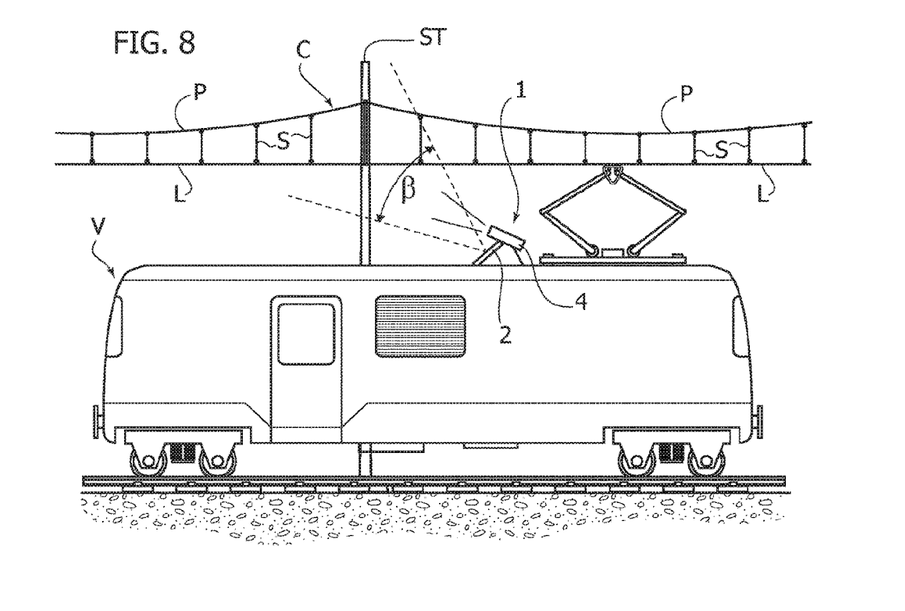
FIGS. 8 and 9 are two views (a lateral view and a perspective view, respectively) of a further embodiment of the measurement system according to the invention.
Figure 9:
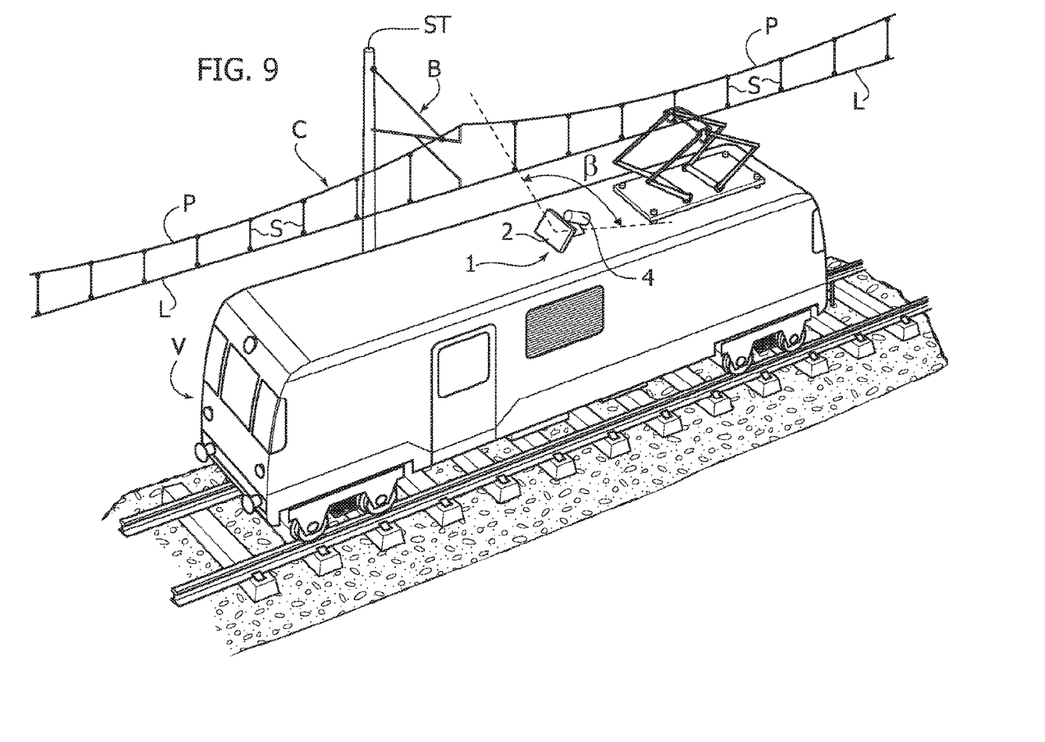
Figure 11:
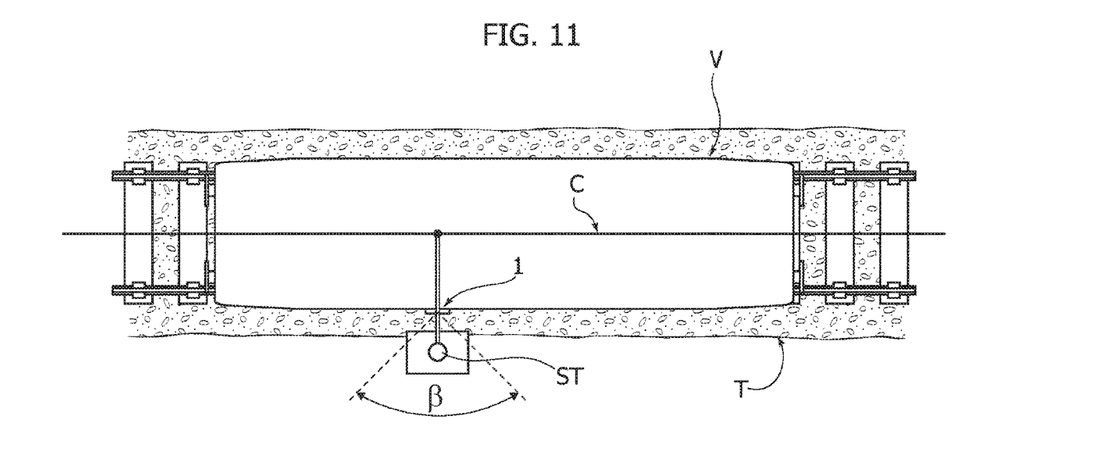

As may be seen in FIG. 6 and FIG. 7, as well as in the subsequent FIGS. 8 and 11, the system 1 is configured for being applied on board a railway vehicle V, which may be either a diagnostic vehicle or an altogether conventional passenger or freight railway vehicle, such as a passenger carriage, a high-speed train, a goods wagon, a locomotive, or even a man-powered railway trolley (e.g., a handcar or jigger). When installed on board a railway vehicle, the system 1 is moreover configured for co-operating with an encoder (or in general any angular-position transducer) connected to a wheelset of a bogie of the railway vehicle (for example, integrated in a position corresponding to an axle-box of the bogie), which provides a synchronization of the data detected by the device 2 with the movement of the vehicle along the plane of the rails.

In particular, each acquisition by the device 2 is started by a pulse that also gives rise to reading of the pulse counter of the encoder 3. In this way, it is possible to provide the measurement with a mileage reference along the stretch of track on which the vehicle V is moving, and it is moreover possible to measure the distance travelled by the vehicle V itself.

Reading by the device 2 is extremely fast, and the device 2 is such that it can operate effectively up to a speed in the region of 300 km/h.

With reference to FIG. 6, a system 1 according to the invention, in which there is a single detection device 2 can be used whenever it is necessary to measure nothing but the position of one or more contact wires L of the overhead line C. The solution of FIG. 7 is, instead, preferable when it is desired to measure also the catenary cable P, which may be hidden by a contact wire L if the system 1 is exactly underneath it.

In the case where the stretch of track presents any characteristic of geometrical irregularity or singularity or in order to prevent partial or incomplete detection due to the fact that the weight-carrying cable P of the overhead line may be masked by the wire L, or again due to the fact that, with a double wire L, one of the two wires may be masked by the other—once again considering installation of the system 1 on the roof of a railway vehicle—, the system is more conveniently built according to the representation of FIG. 7, i.e., with at least two electromagnetic-wave detection devices 2A, 2B (preferably, phased-array radars) arranged on opposite sides of the vehicle V and having mutually incident axes. In this way, any object that is masked for one of the two radars 2A, 2B will not be masked for the other.

In these embodiments of the system 1, there arises, however, the need to discern the return echoes of each radar 2A, 2B in order to prevent false recognition events.

A first solution consists in supplying the radars 2A, 2B with signals having different frequencies in such a way as to filter the signals corresponding to the reflected electromagnetic waves with filters sensitive to the frequencies, thus easily distinguishing the echoes of the radar 2A from the echoes of the radar 2B.

A second possibility consists in controlling the radars 2A, 2B (and any further radar 2 that may make up the instrument 1) by means of the so-called time-sharing technique, i.e., assigning to each radar 2A, 2B a window operating in a given time interval so as to have a biunique correspondence between the specific instant in time and the emitted and reflected electromagnetic waves. In other words, in this case, there is the certainty that at a given instant one and only one radar of the array of the system 1 is working, according to the radar activation sequence.

In still further embodiments, it is possible to control the radars 2A, 2B and further possible radars of the system 1 in such a way that the two management techniques—variable frequency and time sharing—are combined with one another.

With reference to FIG. 8, in a further embodiment of the invention, the system 1 is configured, in particular, for measuring the position and detecting the geometry of brackets that carry the overhead line C. The brackets are identified by the reference B and generally comprise a frame set in cantilever fashion with respect to a support pole ST to which the weight-carrying cable or catenary P is fixed. In this case, in addition to one or more electromagnetic-wave detection devices 2, once again preferably arranged on the roof of a railway vehicle, the system 1 advantageously comprises one or more image-acquisition devices 4 configured for framing the corresponding line infrastructure (the bracket B) and for providing, by means of image-processing algorithms in themselves known, an indication of the geometry of the bracket B itself and—in combination with the data acquired by means of the device 2—an indication of the position thereof with respect to the plane of the rails (height in the direction Z with respect to axis Y/plane XY, with axis Z perpendicular to the plane XY).

Combination of the device 2 with the image-acquisition devices 4 is important in so far as the device 2 provides intrinsically calibrated geometrical dimensions, whereas the dimensions in the image vary as a function of the distance, the optics, and the angle of view.

Figure 10:
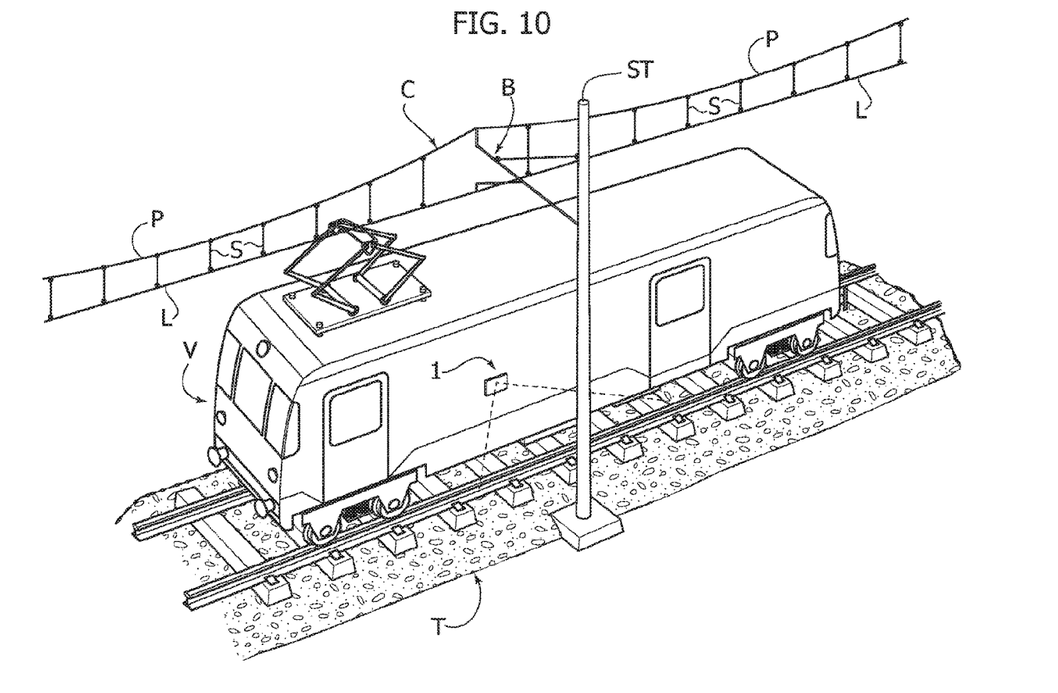
FIGS. 10 and 11 illustrate, in perspective view and in plan view, respectively, a further embodiment of the system according to the invention.

With reference to FIGS. 10 and 11, in yet a further embodiment of the system 1, it is possible to provide a radar 2 that can be installed on one side of the railway vehicle V and is configured for detecting the position of the support poles ST.

Also in this case, the electromagnetic-wave detection device 2 is preferably a radar of the phased-array type configured for scanning the railway infrastructure within a measurement range defined by the angle β, which may vary as a function of driving of the transceiver antennas of the radar 2 itself.

Figure 12:
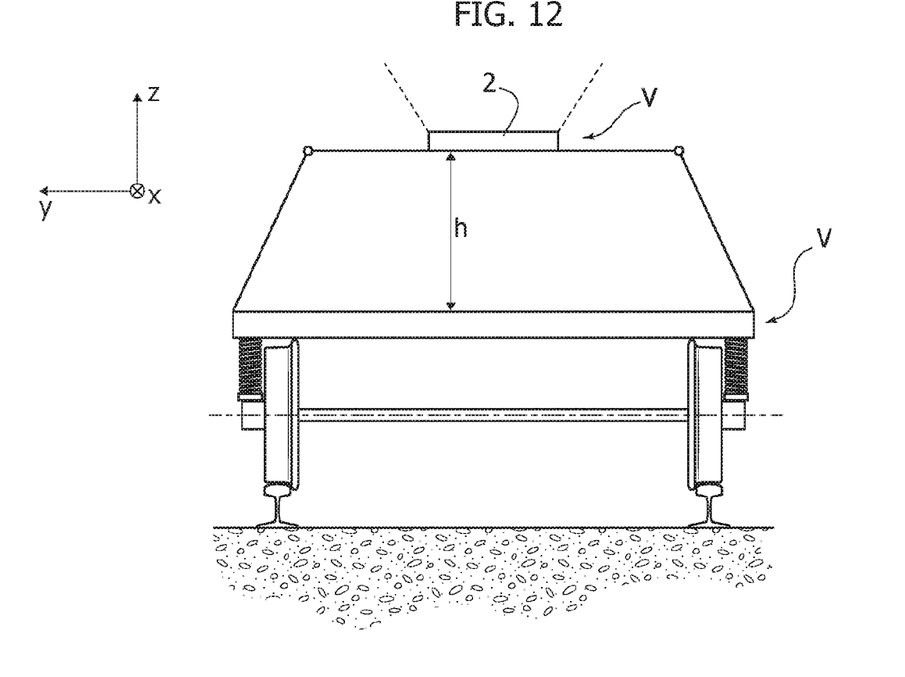
FIGS. 12 and 13 illustrate yet a further embodiment of the invention.
Figure 13:
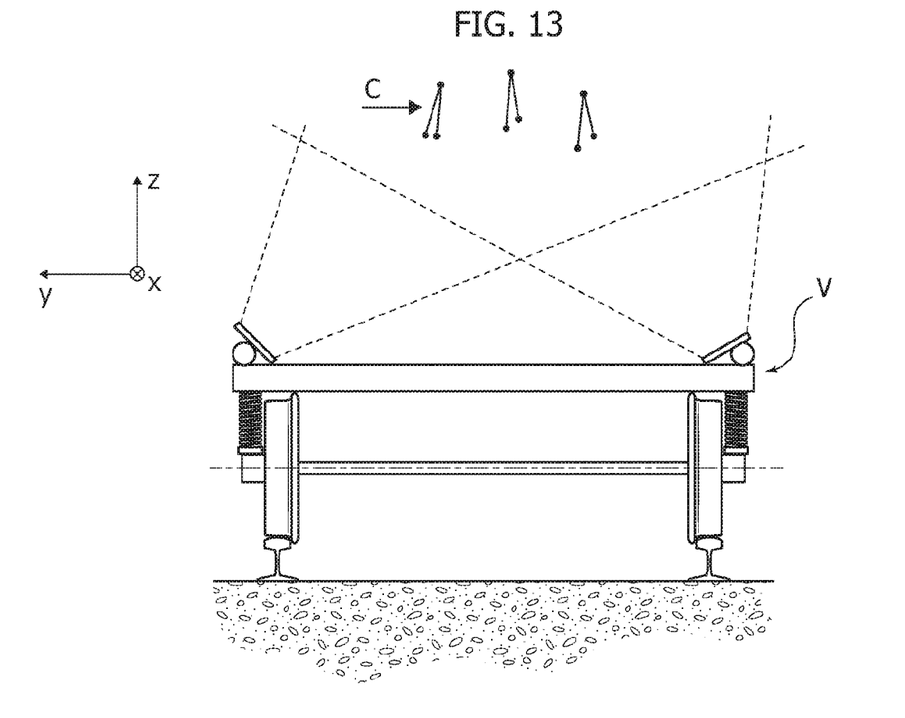

With reference to FIGS. 12 and 13, in yet a further embodiment of the system 1, it is possible to envisage a radar 2 that can be installed on a bed of a railway car or trolley, even man-powered or pushed or towed by people on the ground, and configured for detecting the position of the wires (weight-carrying cable P or contact wires L) of the overhead line C. The reference parameter is in this case the distance h, measured in the (vertical) direction Z with respect to the plane (parallel to the plane XY) tangential to the bed of the wagon or trolley, that corresponds to the distance of the system 1 from the plane of the bed itself.

The distance h is a function of the desired transverse resolution (axis Y) of the instrument: the better the desired resolution, the greater the distance h. Also in this case, the electromagnetic-wave detection device 2 is preferably a radar of the phased-array type configured for scanning the railway infrastructure (overhead line L) in a measurement range defined by the angle β, which varies as a function of driving of the transceiver antennas of the radar 2 itself. According to an advantageous aspect of the invention, the hardware of the system 1 is unified for all the applications described herein; i.e., preferably the array of transceiver antennas always has the same structure irrespective of the application.

Adaptation of the working parameters is obtained by generation of different signals for driving the antennas. The angle β is typically one of the parameters that are adapted by making variations to the driving signals. For instance, in the case of vehicles V constituted by low or lowered wagons, bogies, or trolleys (small distance h), it is preferable to set an angle β to smaller values than in the case of a large distance h, so as to explore always and only the area that is of interest in the transverse direction Y.

Figure 14:
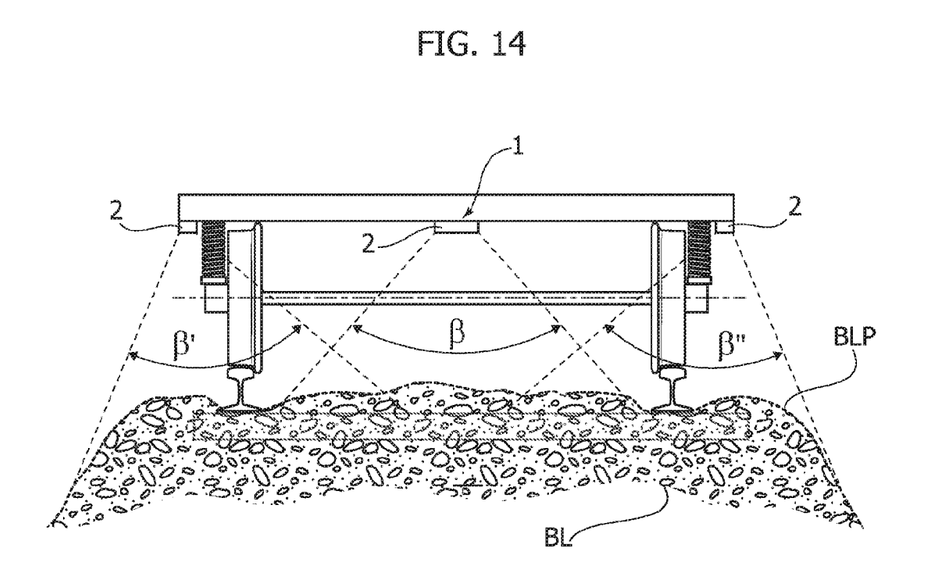
FIG. 14 illustrates yet a further embodiment of the invention, configured, in particular, for detecting a profile of the ballast on the grade.

With reference to FIG. 14, in yet a further embodiment of the system 1, it is possible to envisage a radar 2 that can be installed underneath the bed of (any) railway vehicle and is configured for detecting a profile BLP of the track ballast BL. In this case, the ballast constitutes the line infrastructure investigated via the system 1, and the profile BPL corresponds to an envelope of the positions of each point of the ballast with respect to the reference system of each electromagnetic-wave detection device 2.

In a preferred embodiment, the system 1 comprises three radars 2, which are arranged one in the central position and the other two on either side of the vehicle so as to cover the entire cross section of the ballast BL. In general, the number of radars 2 is commensurate with the cross section of the ballast and the measurement angle (or measurement angular range) β of each radar 2. By way of example, in FIG. 14 the three radars 2 are represented as having measurement angles β (central radar), β' (left-hand radar), β" (right-hand radar). According to the needs, the three angular values may be identical to one another, specialized by area (for example, β≠β'≠β"), or else all different from one another (β≠β'≠β").

Detection of the profile BLP of the ballast BL yields, as the railway vehicle V is travelling, a succession of transverse profiles (i.e., profiles transverse with respect to the railway track, hence with respect to the direction of movement) that correspond either to a segment of track between two successive sleepers or to a segment of track spanning a sleeper. The profile detected in the latter segment provides a reference for processing the profile detected in the space between successive sleepers: in particular, the control unit C may be programmed for recognizing the profiles BPL detected in spaces between successive sleepers (hence representing just the ballast) and the ones obtained where a sleeper is present in such a way as to compare the former with the latter and determine the deviations of the profile BPL of just the ballast with respect to the profiles BPL detected where the sleepers are present (which represent for the most part the profiles of the sleepers themselves). There can hence be calculated an indicator of deviation of the profile detected where just the ballast is present with respect to the profile detected where just the sleepers are present, and there can be recorded a fault when the indicator of deviation is excessive in a positive direction (ballast on the sleepers: risk of damage to the underside of the railway vehicles owing to stones getting kicked up) or in a negative direction (ballast too far below the sleepers: risk of shifting of the grade).

Also in the case of the embodiment of FIG. 14, the system 1 may be equipped with one or more image-acquisition devices that co-operate with the one or more electromagnetic-wave detection devices (e.g., radars) 2.

In each of the embodiments described herein, the system 1 enables implementation of a method for detection of line infrastructures comprising:

installing the detection system 1 on a railway vehicle V, whatever the type (locomotive, coach, wagon, trolley, or handcar);

moving the railway vehicle along a railway track where the line infrastructures that are to undergo detection are located;

activating the at least one electromagnetic-wave detection device (e.g., the radar 2) for directing electromagnetic waves towards the line infrastructure that is to undergo detection; and processing, by means of the control unit, the electromagnetic waves reflected by the line infrastructure and determining a position of the line infrastructure with respect to a pre-set reference system (for example, with respect to a local reference system of the device 2, or else again with respect to a reference system in turn defined with respect to one or more local reference systems of the device 2 or devices 2).

The person skilled in the branch will appreciate that the system 1 according to the invention is free from all the problems of soiling that afflict optical devices of a known type, while preserving all the advantages thereof. The electromagnetic-wave detection devices 2 are, in fact, substantially insensitive to soiling—whether they are mounted on the roof, on the sides, or beneath the bed of the vehicle—and can likewise be installed as desired on the railway vehicle according to the needs. In addition, the electromagnetic-wave detection devices 2 do not require any contact between them and the overhead line C so that they can be used for measuring any segment of the line, even not involved in supply of the railway vehicle V.

Of course, the details of construction and the embodiments may vary widely with respect to what has been described and illustrated herein, without thereby departing from the scope of the present invention, as defined in the annexed claims.

The invention claimed is:

1. A detection system for line infrastructures of a railway line, comprising:
    at least one electromagnetic-wave detection device comprising at least one transceiver antenna, the electromagnetic-wave detection device being configured for emitting electromagnetic waves towards a line infrastructure by means of said at least one transceiver antenna, and for receiving electromagnetic waves reflected by said line infrastructure; and
    a control unit configured for processing the electromagnetic waves reflected by said line infrastructure and determining a position of said line infrastructure with respect to a pre-set reference system,
    wherein said at least one electromagnetic-wave detection device is configured for installation on board a railway vehicle,
    wherein said at least one electromagnetic-wave detection device comprises a phased-array radar, including a plurality of transceiver antennas, and
    wherein the detection system is configured for co-operating with an angular position transducer connected to a wheelset of a bogie of the railway vehicle.

2. The detection system according to claim 1 wherein said at least one electromagnetic-wave detection device comprises a pair of phased-array radars having incident axes.

3. The detection system according to claim 2, wherein the transceiver antennas of a first phased-array radar of said pair of phased array radars are supplied at a different frequency as compared to the transceiver antennas of a second phased-array radar of said pair of phased array radars.

4. The detection system according to claim 1, further comprising at least one image-acquisition device configured for co-operating with said at least one electromagnetic-wave detection device for acquisition of image data regarding the line infrastructure hit by the electromagnetic waves emitted by said at least one electromagnetic-wave detection device.

5. A railway vehicle comprising a detection system according to claim 1.

6. The railway vehicle according to claim 5, wherein said detection system is installed, in combination or alternatively:
    on a roof of the vehicle,
    along a side of the body of the vehicle, and
    beneath a bed of the vehicle.

7. A method for detecting line infrastructures by means of a detection system according to claim 1, comprising:
    installing the detection system on the railway vehicle;
    moving the railway vehicle along a railway track where the line infrastructures that are to undergo detection are located;
    activating said at least one electromagnetic-wave detection device to direct electromagnetic waves towards the line infrastructure that is to undergo detection, wherein said at least one electromagnetic-wave detection device does not include an optical detection device; and
    processing, by means of said control unit, the electromagnetic waves reflected by said line infrastructure and determining a position of said line infrastructure with respect to a pre-set reference system.

8. The method according to claim 7, wherein said line infrastructure is at least one of the following:
    an overhead power line;
    support brackets of an overhead power line;
    support poles of an overhead power line; and
    ballast of the railway track.

9. The method according to claim 8, wherein the line infrastructure is ballast of the railway track, and said determining a position of said line infrastructure with respect to a pre-set reference system comprises determining a profile of said ballast along a transverse section of the railway track transverse with respect to a direction of travel of movement of the railway vehicle.

10. A detection system for line infrastructures of a railway line, comprising:
    at least one electromagnetic-wave detection device comprising at least one transceiver antenna, the electromagnetic-wave detection device being configured for emitting electromagnetic waves towards a line infrastructure by means of said at least one transceiver antenna, and for receiving electromagnetic waves reflected by said line infrastructure; and
    a control unit configured for processing the electromagnetic waves reflected by said line infrastructure and determining a position of said line infrastructure with respect to a pre-set reference system,
    wherein said at least one electromagnetic-wave detection device is configured for installation on board a railway vehicle,
    wherein said at least one electromagnetic-wave detection device comprises a phased-array radar, including a plurality of transceiver antennas,
    wherein said at least one electromagnetic-wave detection device does not include an optical detection device.

* * * * *